Figure 1:
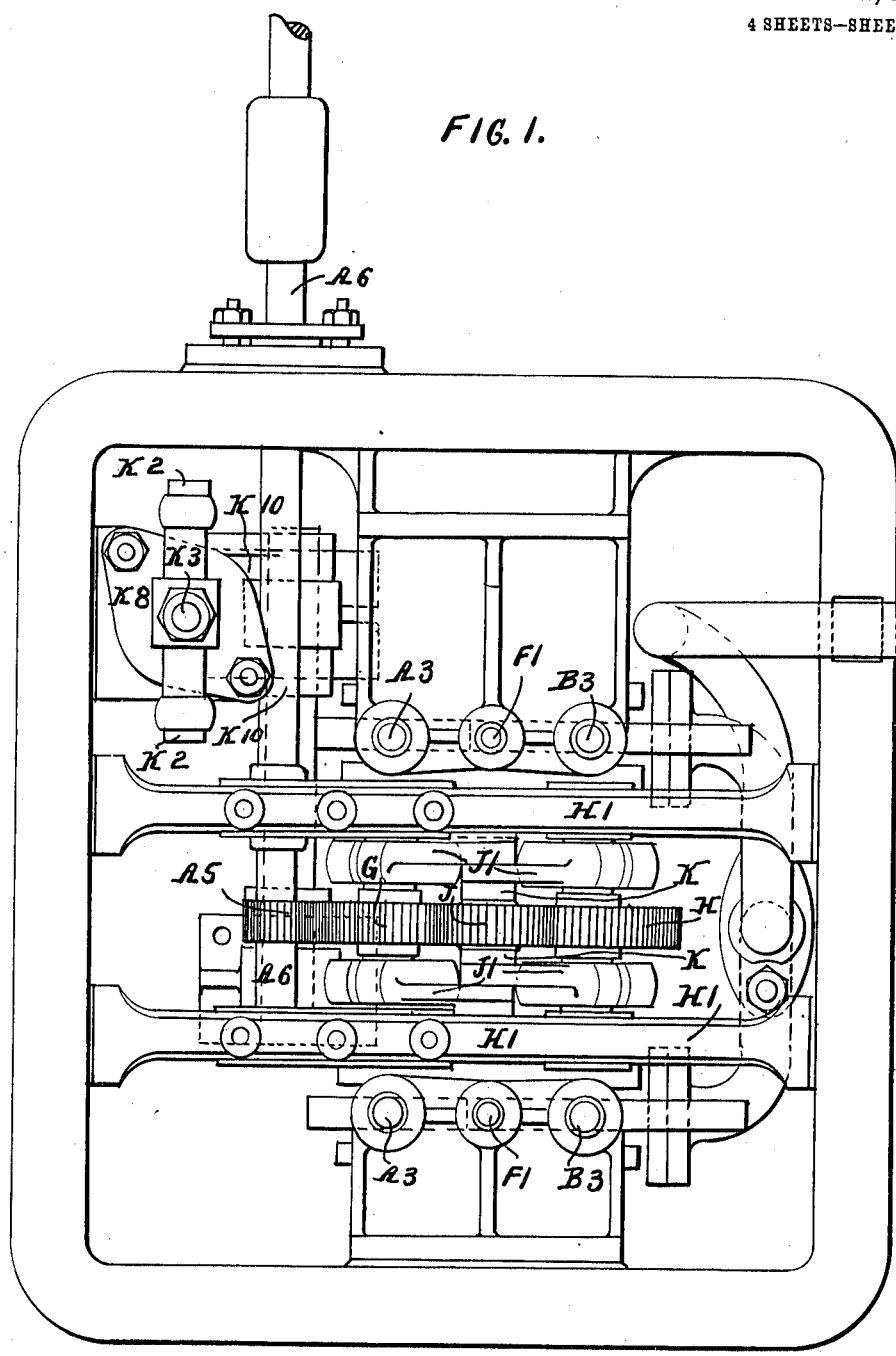

W. G. GIBBONS.
VARIABLE DELIVERY PUMP FOR HYDRAULIC TRANSMISSION SYSTEMS.
APPLICATION FILED OCT. 12, 1911.

1,020,277.

Patented Mar. 12, 1912.

4 SHEETS—SHEET 1.

WITNESSES

INVENTOR
William G. Gibbons
by Howson and Howson
attys.

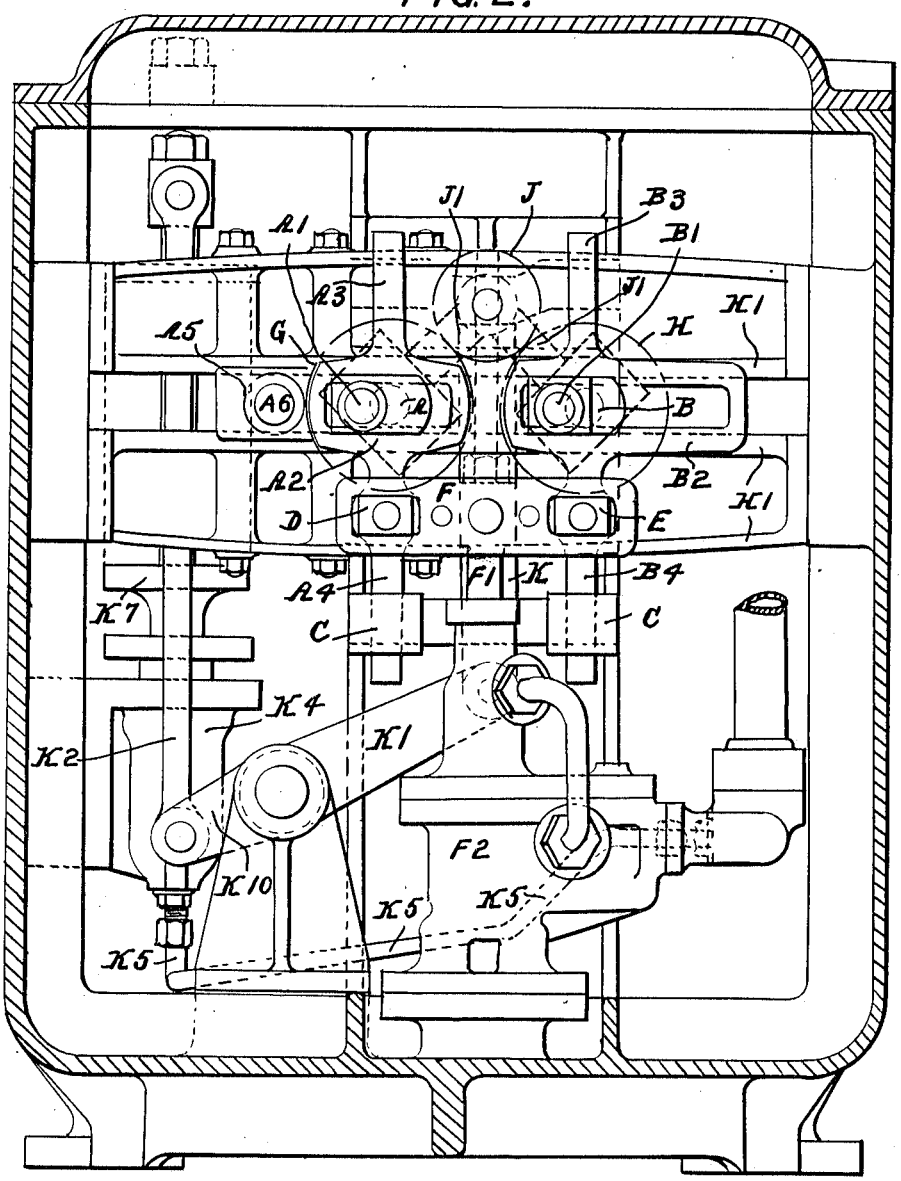

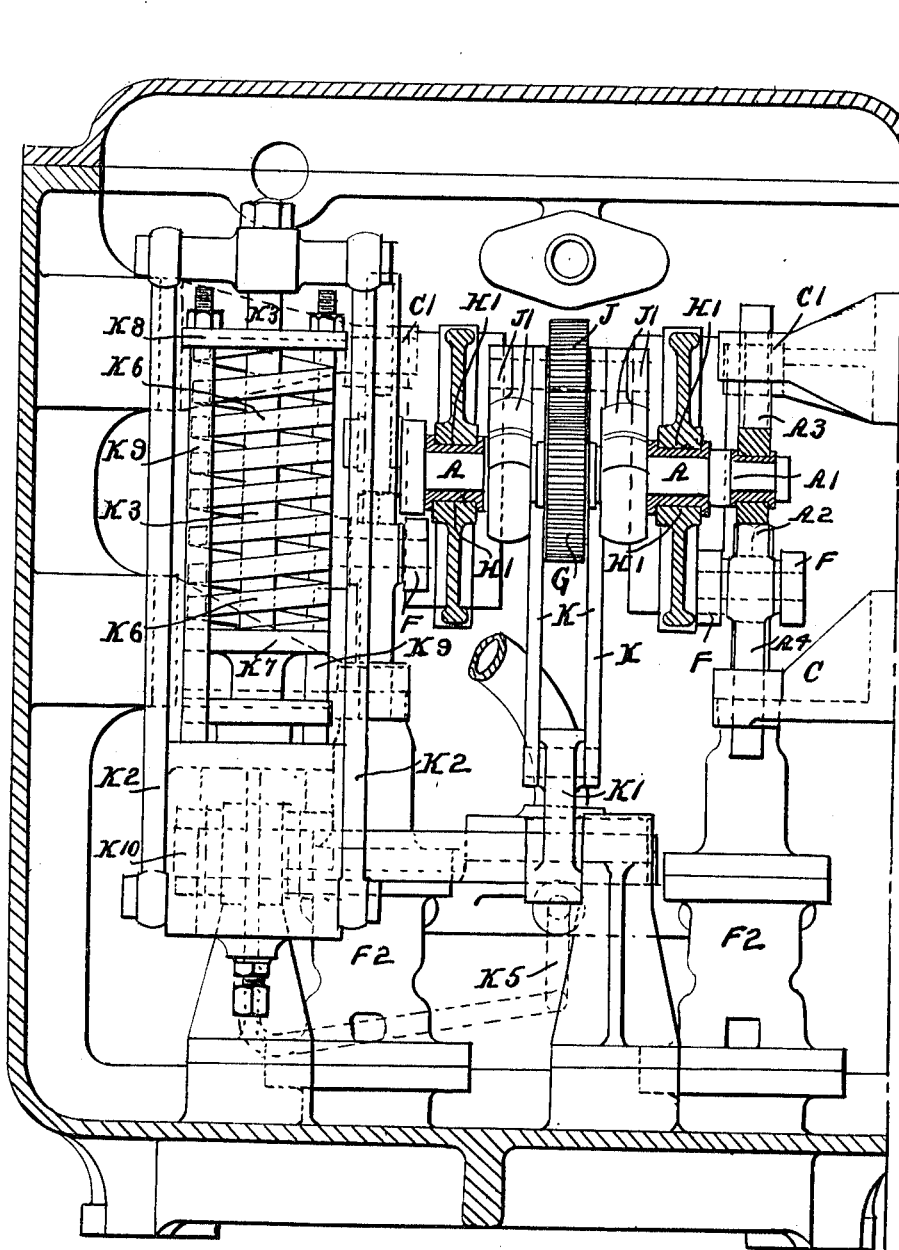

W. G. GIBBONS.
VARIABLE DELIVERY PUMP FOR HYDRAULIC TRANSMISSION SYSTEMS.
APPLICATION FILED OCT. 12, 1911.

1,020,277.

Patented Mar. 12, 1912.

4 SHEETS—SHEET 4.

WITNESSES
William Abbe
Margaret M. McCathran

INVENTOR
William G. Gibbons
by Howson and Howson
attys.

UNITED STATES PATENT OFFICE.

WILLIAM GREGORY GIBBONS, OF EDINBURGH, SCOTLAND.

VARIABLE-DELIVERY PUMP FOR HYDRAULIC TRANSMISSION SYSTEMS.

1,020,277. Specification of Letters Patent. Patented Mar. 12, 1912.

Application filed October 12, 1911. Serial No. 654,356.

*To all whom it may concern:*

Be it known that I, WILLIAM GREGORY GIBBONS, a subject of the King of Great Britain and Ireland, and a resident of Edinburgh, Scotland, have invented certain new and useful Improvements in Variable-Delivery Pumps for Hydraulic Transmission Systems, and of which the following is the specification.

The invention relates to that type of hydraulic transmission system consisting of a mechanically operated pump mechanism supplying fluid variable in amount or in pressure to a receiving mechanism which may be a hydraulic motor, ram, or other apparatus, and has for its object to provide an efficient and simple combination of devices for varying the pump delivery—while in addition there may be provided means for maintaining a constant torque resistance in the driving shaft with a varying pressure in the transmission system. This combination of devices consists essentially of two crank shafts arranged side by side, the first fixed in position and adapted to be operated by a prime-mover, the second movable radially to and from the first and driven by gearing therefrom. The gearing between the two shafts is adapted to vary the angular position of the shafts (and so the phases of the cranks on them) relatively the one to the other, and consists of a pinion upon each shaft with which there meshes an intermediate pinion. The intermediate pinion is carried upon radial links pivoted on the axes of the shafts—or by equivalent devices—and so is kept in gear with them; the second and movable shaft being moved to and from the first shaft by the toggle-link movements of the shaft carrying the pinions. The intermediate pinion is thus movable through an arc around each shaft, and its movement through a given angle varies the relative angular positions one to the other of the two crank shafts twice that amount. There are two methods of applying this relatively movable crank shaft device to the pump mechanism of a hydraulic transmission system, and in order that the invention and the manner of performing the same may be properly understood there are hereunto appended four sheets of explanatory drawings showing three examples of the carrying out of the invention—the first two examples illustrative of the first method, the third example of the second method.

Figure 5:
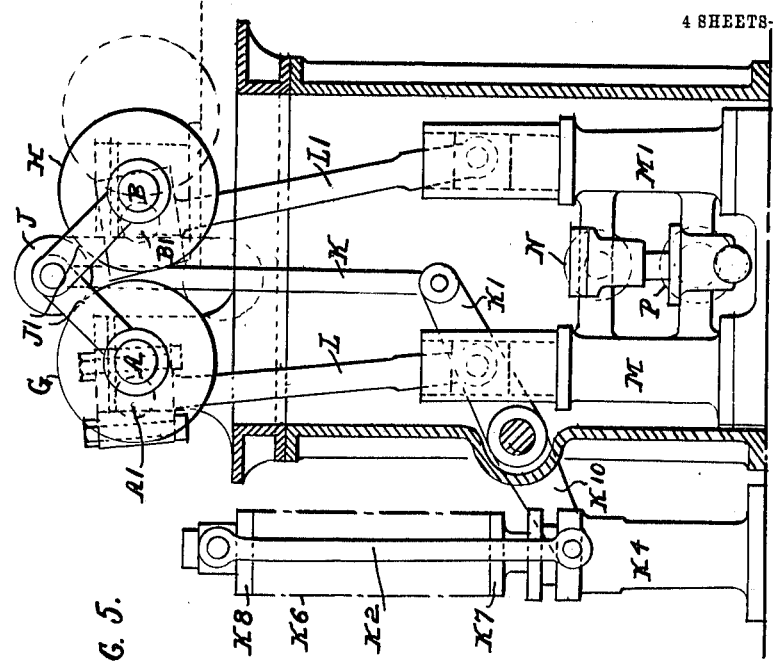
Figure 4:
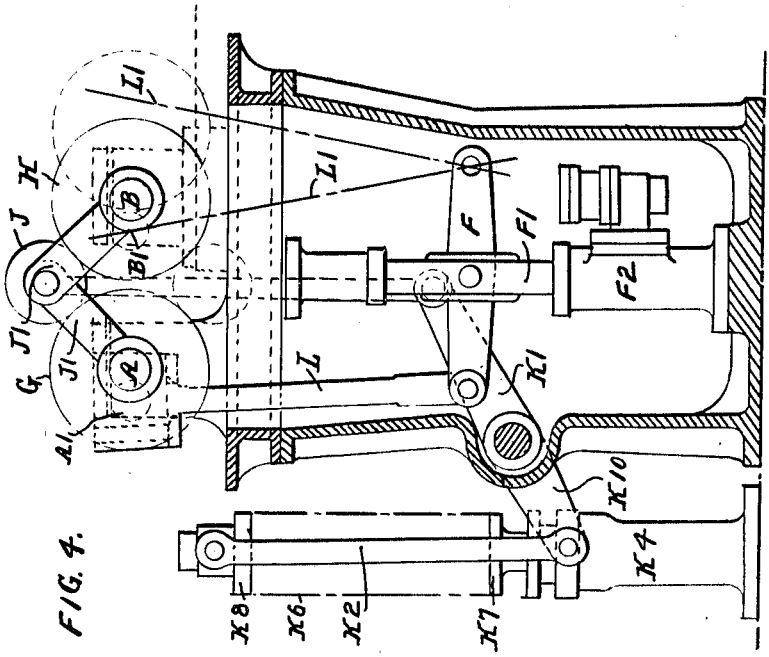

Figure 1 Sheet 1, Fig. 2 Sheet 2, and Fig. 3 Sheet 3, show in plan in sectional front and in sectional side elevation, respectively, the first example. Fig. 4, Sheet 4, shows in somewhat diagrammatic elevation the second example. And Fig. 5 shows similarly the third example.

According to the example of the first method shown in Figs. 1 to 4, similar cranks $A^1$ $B^1$ upon two crank shafts A, B engage slotted crossheads $A^2$, $B^2$ which have upon them guide rods $A^3$, $A^4$, $B^3$, $B^4$ sliding at their lower ends in bosses in fixed brackets C, and at their upper ends similarly in brackets $C^1$—the parts being in duplicate, that is to say, there are two cranks $A^1$, two cranks $B^1$, two crossheads $A^2$, two crossheads $B^2$, and so on (Fig. 2). Blocks D, E, (two of each) engage slots in the outer ends of floating levers F which are pivoted at their centers upon the piston rods $F^1$ of two pumps $F^2$. The crank shaft A is driven through a pinion G on it gearing with a pinion $A^5$ on a shaft $A^6$ coupled to any convenient source of power. On the two crank shafts A, B, are similar pinions G, H, which both gear with an intermediate pinion J the shaft of which is connected by toggle links $J^1$ with the two crank shafts A, B, so that the pinion J is constrained at all times to remain in gear with the pinions G, H. The shaft A is carried in fixed bearings, but the shaft B is carried in a block sliding in guides $H^1$. Now, it is apparent that if the pinion J be moved down forcing the shaft B laterally outward in its guides $H^1$ by the toggle links $J^1$, the cranks $A^1$, $B^1$, will be altered in phase one to another, and whereas if they move synchronously in the position shown in Fig. 1, so moving the floating levers F bodily up and down, the full stroke of the pumps $F^2$ will be given, when a certain point is reached in the downward movement of the pinion J they will move in opposition and the floating levers F be rocked on their pivots without operating the pump—the stroke of the pump of course varying between these limits in accordance with the position of the pinion J. Naturally during this movement, the cranks $B^1$ move laterally, and consequently to accommodate this the slots in the crossheads $B^2$ are made of sufficiently greater length than those in the crossheads $A^2$ as the crank shaft A, the cranks $A^1$ of which operate those crossheads, does not move. The pinion J may be adjusted in position by hand, but preferably it is automatically adjusted in accordance with the variation in pressure in the system—with this latter arrangement there is thus automatically maintained a constant torque resistance on the pump driving shaft notwithstanding that the pressure in the transmission system varies. To this end the spindle of the pinion J is connected by links K with a lever $K^1$ pivoted in a shaft in fixed brackets on which are two short levers $K^{10}$ connected by links $K^2$ with the piston rod $K^3$ of a hydraulic cylinder $K^4$ connected to the pump delivery by a pipe $K^5$ and loaded by a spring $K^6$ which rests upon a collar $K^7$ on the piston rod $K^3$ and is adjustably held by a stirrup $K^8$ on rods $K^9$ extending up from the cylinder $K^4$. Thus, as the pressure in the pump delivery rises, the piston or ram in the cylinder $K^4$ rises, compressing the spring and, through the links $K^2$, K, and lever $K^1$, moving the pinion J so as to shorten the effective stroke of the pumps $F^2$.

The elements of the mechanism are more easily seen in that example diagrammatically illustrated in Fig. 4 which only differs in that the cranks $A^1$, $B^1$, are directly connected by connecting rods L, $L^1$ (the latter indicated by a chain line) with the floating lever F—the crank shaft B being carried in plumber blocks $L^2$ laterally sliding in guides (not shown). This example has the slight disadvantages of the effect of connecting-rod angularity avoided by the slotted crosshead devices of the first example. Again, the example shown in Fig. 5 differs only in the manner of pump operation. Here the second method is involved, and instead of there being one pump in each unit the stroke of which is varied, the pump unit consists of two pumps M, $M^1$, with common suction N and discharge P. If the operating cranks $A^1$, $B^1$, be in similar phase, then the pump unit will deliver to the full capacity of both its members M, $M^1$. If the cranks be in opposite phase, the liquid they operate will merely pass from one pump member to the other without any passing to the delivery. And so for any intermediate position of the cranks precisely as in the first method. To the second and third examples there is shown applied the device for automatically adjusting the position of the pinion J, but the pinion in them equally as in the first example may be operated by any other convenient means.

It is obvious that any convenient number of units (of which in the first example there are shown two) may be combined in coöperation.

What I claim is:—

1. In hydraulic transmission gearing, pump mechanism, comprising two parallel crank shafts, gearing interconnecting said crank shafts, said gearing being constructed and arranged to permit the relative positions of the cranks to be varied during operation, and a pump-unit operatively connected to the cranks.

2. In hydraulic transmission gearing, pump mechanism comprising two parallel crank shafts, means for moving them radially the one to the other, a pinion on each shaft, a third and intermediate pinion gearing with both said pinions, means for keeping said intermediate pinion in gear, means for moving it relatively to the shaft pinions and operative connection between the cranks and a pump unit.

3. In hydraulic transmission gearing, pump mechanism, comprising two parallel crank shafts, gearing interconnecting said crank shafts, said gearing being constructed and arranged to permit the relative positions of the cranks to be varied during operation, connecting rods on the cranks and a pump-unit operatively connected thereto.

4. In hydraulic transmission gearing, pump mechanism comprising two parallel crank shafts, means for moving them radially the one to the other, a pinion on each shaft, a third and intermediate pinion gearing with both said pinions, means for keeping said intermediate pinion in gear, means for moving it relatively to the shaft pinions, connecting rods on the cranks and a pump-unit operatively connected thereto.

5. In hydraulic transmission gearing, pump mechanism, comprising two parallel crank shafts, gearing interconnecting said crank shafts, said gearing being constructed and arranged to permit the relative positions of the cranks to be varied during operation, connecting rods on the cranks, a floating lever to the ends of which said connecting rods are attached, and a pump unit operatively connected to the center of the floating lever.

6. In hydraulic transmission gearing, pump mechanism comprising two parallel crank shafts, means for moving them radially the one to the other, a pinion on each shaft, a third and intermediate pinion gearing with both said pinions, means for keeping said intermediate pinion in gear, means for moving it relatively to the shaft pinions, connecting rods on the cranks, a floating lever to the ends of which said connecting rods are attached, and a pump unit operatively connected to the center of the floating lever.

7. In hydraulic transmission gearing, pump mechanism comprising two parallel crank shafts, means for moving them radially the one to the other, a pinion on each shaft, a third and intermediate pinion gearing with both said pinions, means for keeping said intermediate pinion in gear, means for moving it relatively to the shaft pinions, a hydraulic cylinder connected to the pump delivery, a loaded ram therein, operative connection between the ram and the means for moving the pinion, and operative connection between the cranks and a pump unit.

In testimony whereof I have signed my name to this specification, in the presence of two subscribing witnesses.

WILLIAM GREGORY GIBBONS.

Witnesses:
 FINLAY DANIELS,
 OLIVER RICHARD PAUL.